US011297366B2

(12) United States Patent
Reid et al.

(10) Patent No.: US 11,297,366 B2
(45) Date of Patent: Apr. 5, 2022

(54) METHODS, SYSTEMS, AND MEDIA FOR OBJECT GROUPING AND MANIPULATION IN IMMERSIVE ENVIRONMENTS

(71) Applicant: Google LLC, Mountain View, CA (US)

(72) Inventors: Bryce Gibson Reid, Burlingame, CA (US); Michael Kent, San Francisco, CA (US); Devin Mancuso, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 318 days.

(21) Appl. No.: 16/616,219

(22) PCT Filed: May 22, 2019

(86) PCT No.: PCT/US2019/033529
§ 371 (c)(1),
(2) Date: Nov. 22, 2019

(87) PCT Pub. No.: WO2020/236171
PCT Pub. Date: Nov. 26, 2020

(65) Prior Publication Data
US 2021/0352348 A1 Nov. 11, 2021

(51) Int. Cl.
H04N 21/2668 (2011.01)
G06F 3/01 (2006.01)
(Continued)

(52) U.S. Cl.
CPC ......... *H04N 21/2668* (2013.01); *G06F 3/011* (2013.01); *H04N 21/2662* (2013.01); *H04N 21/2665* (2013.01); *G02B 27/0172* (2013.01)

(58) Field of Classification Search
CPC ........... H04N 21/2668; H04N 21/2662; H04N 21/2665; G06F 3/011; G02B 27/0172
See application file for complete search history.

(56) References Cited

U.S. PATENT DOCUMENTS 10,613,703 B2 4/2020 Diverdi et al.
2008/0148152 A1 6/2008 Blinnikka et al.
(Continued)

FOREIGN PATENT DOCUMENTS

CN 107632705 A 1/2018
CN 109407821 A 3/2019
(Continued)

OTHER PUBLICATIONS

International Search Report and Written Opinion dated Feb. 19, 2020 in International Patent Application No. PCT/US2019/033529.

*Primary Examiner* — Oschta I Montoya
(74) *Attorney, Agent, or Firm* — Brake Hughes Bellermann LLP

(57) ABSTRACT

Methods, systems, and media for object grouping and manipulation in immersive environments are provided. The method comprises: displaying a plurality of video objects in an immersive environment; detecting, via a first input, that a first video object has been virtually positioned over a second video object; in response to detecting that the first video object has been virtually positioned over the second video object, generating a group video object that includes the first video object and the second video object, wherein the group video object includes a handle interface element for interacting with the group video object and a selectable indicator that represents the first video object and the second video object; displaying the group video object along with the handle interface element and the selectable indicator with one or more remaining video objects in the immersive environment, wherein the group video object replaces the first video object and the second video object within the immersive environment; and, in response to detecting a selection of the selectable indicator, displaying a user interface for interacting with the group video object.

19 Claims, 9 Drawing Sheets

(51) Int. Cl.
*H04N 21/2662* (2011.01)
*H04N 21/2665* (2011.01)
*G02B 27/01* (2006.01)

(56) References Cited

U.S. PATENT DOCUMENTS

| | | | |
|---|---|---|---|
| 2014/0306891 A1* | 10/2014 | Latta | G02B 27/017 |
| | | | 345/158 |
| 2017/0060230 A1 | 3/2017 | Faaborg et al. | |
| 2017/0169616 A1* | 6/2017 | Wiley | G06F 3/04842 |
| 2017/0212906 A1 | 7/2017 | Kang | |
| 2018/0121069 A1 | 5/2018 | Diverdi et al. | |
| 2018/0130264 A1 | 5/2018 | Ebacher | |
| 2018/0182436 A1 | 6/2018 | Ullrich | |
| 2018/0307303 A1* | 10/2018 | Powderly | G02B 27/017 |
| 2019/0130622 A1* | 5/2019 | Hoover | G02B 27/017 |
| 2019/0187876 A1* | 6/2019 | Platt | G06F 3/0482 |
| 2019/0384407 A1* | 12/2019 | Smith | G06K 9/00389 |
| 2020/0047074 A1* | 2/2020 | Zhang | G06F 3/017 |
| 2021/0191505 A1* | 6/2021 | Cricri | G06F 3/14 |

FOREIGN PATENT DOCUMENTS

| | | |
|---|---|---|
| EP | 2835800 | 2/2015 |
| WO | WO 2019067902 | 4/2019 |

\* cited by examiner

METHODS, SYSTEMS, AND MEDIA FOR OBJECT GROUPING AND MANIPULATION IN IMMERSIVE ENVIRONMENTS

TECHNICAL FIELD

The disclosed subject matter relates to methods, systems, and media for object grouping and manipulation in immersive environments.

BACKGROUND

Many users enjoy viewing video content in immersive environments, such as virtual reality content, augmented reality content, three-dimensional content, 180-degree content, or 360-degree content, that can provide a viewer with an immersive experience. For example, a virtual reality system can generate an immersive virtual reality environment for a user, where the user can interact with one or more virtual objects. In a more particular example, the immersive virtual reality environment can be provided using devices, such as virtual reality headset devices or head mounted display devices. In another example, an augmented reality system can generate an immersive augmented reality environment for a user, where computer-generated content (e.g., one or more images) can be superimposed on a user's current view (e.g., using a camera of a mobile device).

It should be noted that a user can navigate and/or interact with an immersive environment in multiple ways. For example, a user can use hand movements to interact with virtual objects in the immersive environment. In another example, a user can operate a controller, such as a ray-based input controller, to interact with virtual objects in the immersive environment by pointing at an object and/or selecting an object by pressing a button located on the controller. Placing, organizing, clustering, manipulating, or otherwise interacting with a group of objects in an immersive environment, however, continues to be a cumbersome and difficult task.

Accordingly, it is desirable to provide new methods, systems, and media for object grouping and manipulation in immersive environments.

SUMMARY

Methods, systems, and media for object grouping and manipulation in immersive environments are provided.

In accordance with some embodiments of the disclosed subject matter, a method for interacting with immersive video content is provided, the method comprising: displaying a plurality of video objects in an immersive environment; detecting, via a first input, that a first video object has been virtually positioned over a second video object; in response to detecting that the first video object has been virtually positioned over the second video object, generating a group video object that includes the first video object and the second video object, wherein the group video object includes a handle interface element for interacting with the group video object and a selectable indicator that represents the first video object and the second video object; displaying the group video object along with the handle interface element and the selectable indicator with one or more remaining video objects in the immersive environment, wherein the group video object replaces the first video object and the second video object within the immersive environment; and, in response to detecting a selection of the selectable indicator, displaying a user interface for interacting with the group video object.

In some embodiments, the immersive environment is a virtual reality environment that is generated in a head mounted display device operating in a physical environment and the handle interface element is a three-dimensional handle element that is interacted with by detecting a grab gesture performed by a hand in the virtual reality environment.

In some embodiments, the first video object is represented by a first thumbnail representation, the second video object is represented by a second thumbnail representation, and the group video object is represented by a stacked thumbnail representation in which (i) the first thumbnail representation and the second thumbnail representation are automatically aligned to generate the stacked thumbnail representation and (ii) the first thumbnail representation is in a top position of the stacked thumbnail representation in response to detecting that the first video object was interacted with and virtually positioned over the second video object.

In some embodiments, the selectable indicator indicates a number of video objects contained in the group video object.

In some embodiments, the user interface includes an option to create a playlist that includes the first video object and the second video object in the group video object and wherein, upon selection of the group video object, the first video object and the second video object are played back in the immersive environment.

In some embodiments, the user interface includes an option to rearrange an order of at least the first video object and the second video object associated with the group video object.

In some embodiments, the user interface includes an option to remove at least one of the first video object and the second video object from the group video object.

In some embodiments, the user interface includes an option to remove the group video object along with the first video object and the second video object from the immersive environment.

In some embodiments, the method further comprises, in response to detecting a particular hand interaction with the handle interface element, causing a grid of video objects included within the group video object to be presented, wherein each video object in the grid of video objects is modifiable.

In some embodiments, the method further comprises, in response to detecting a particular hand interaction with the handle interface element, causing the group video object along with the first video object and the second video object to be removed from the immersive environment.

In accordance with some embodiments of the disclosed subject matter, a system for interacting with immersive video content is provided, the system comprising a memory and a hardware processor that, when executing computer executable instructions stored in the memory, is configured to: display a plurality of video objects in an immersive environment; detect, via a first input, that a first video object has been virtually positioned over a second video object; in response to detecting that the first video object has been virtually positioned over the second video object, generate a group video object that includes the first video object and the second video object, wherein the group video object includes a handle interface element for interacting with the group video object and a selectable indicator that represents the first video object and the second video object; display the group video object along with the handle interface element and the selectable indicator with one or more remaining video objects in the immersive environment, wherein the group video object replaces the first video object and the second video object within the immersive environment; and, in response to detecting a selection of the selectable indicator, display a user interface for interacting with the group video object.

In accordance with some embodiments of the disclosed subject matter, a non-transitory computer-readable medium containing computer executable instructions that, when executed by a processor, cause the processor to perform a method for interacting with immersive video content is provided, the method comprising: displaying a plurality of video objects in an immersive environment; detecting, via a first input, that a first video object has been virtually positioned over a second video object; in response to detecting that the first video object has been virtually positioned over the second video object, generating a group video object that includes the first video object and the second video object, wherein the group video object includes a handle interface element for interacting with the group video object and a selectable indicator that represents the first video object and the second video object; displaying the group video object along with the handle interface element and the selectable indicator with one or more remaining video objects in the immersive environment, wherein the group video object replaces the first video object and the second video object within the immersive environment; and, in response to detecting a selection of the selectable indicator, displaying a user interface for interacting with the group video object.

In accordance with some embodiments of the disclosed subject matter, a system for generating immersive video content is provided, the system comprising: means for displaying a plurality of video objects in an immersive environment; means for detecting, via a first input, that a first video object has been virtually positioned over a second video object; means for generating a group video object that includes the first video object and the second video object in response to detecting that the first video object has been virtually positioned over the second video object, wherein the group video object includes a handle interface element for interacting with the group video object and a selectable indicator that represents the first video object and the second video object; means for displaying the group video object along with the handle interface element and the selectable indicator with one or more remaining video objects in the immersive environment, wherein the group video object replaces the first video object and the second video object within the immersive environment; and means for displaying a user interface for interacting with the group video object in response to detecting a selection of the selectable indicator.

The subject matter described in this specification can be implemented in particular embodiments so as to realize one or more of the following advantages. By providing a handle interface element and a selectable indicator, first and second video objects can be grouped within an immersive environment to make more efficient use of space within the immersive environment whilst ensuring that the user can easily and efficiently interact with the grouped video objects. Grouping the video objects provides the additional advantage of reducing the processing power required to display the video objects by replacing the first and second video objects with a group video object. The handle interface element provides an intuitive mechanism for a user to interact with the group video object using natural gestures, such as a grab gesture, a shaking gesture, etc. This avoids the need to provide dedicated user interface elements within the immersive environment for each potential interactions, thereby allowing the grouped video objects to be represented and interacted with in a more computationally efficient manner that makes more efficient use of real estate within the immersive environment.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
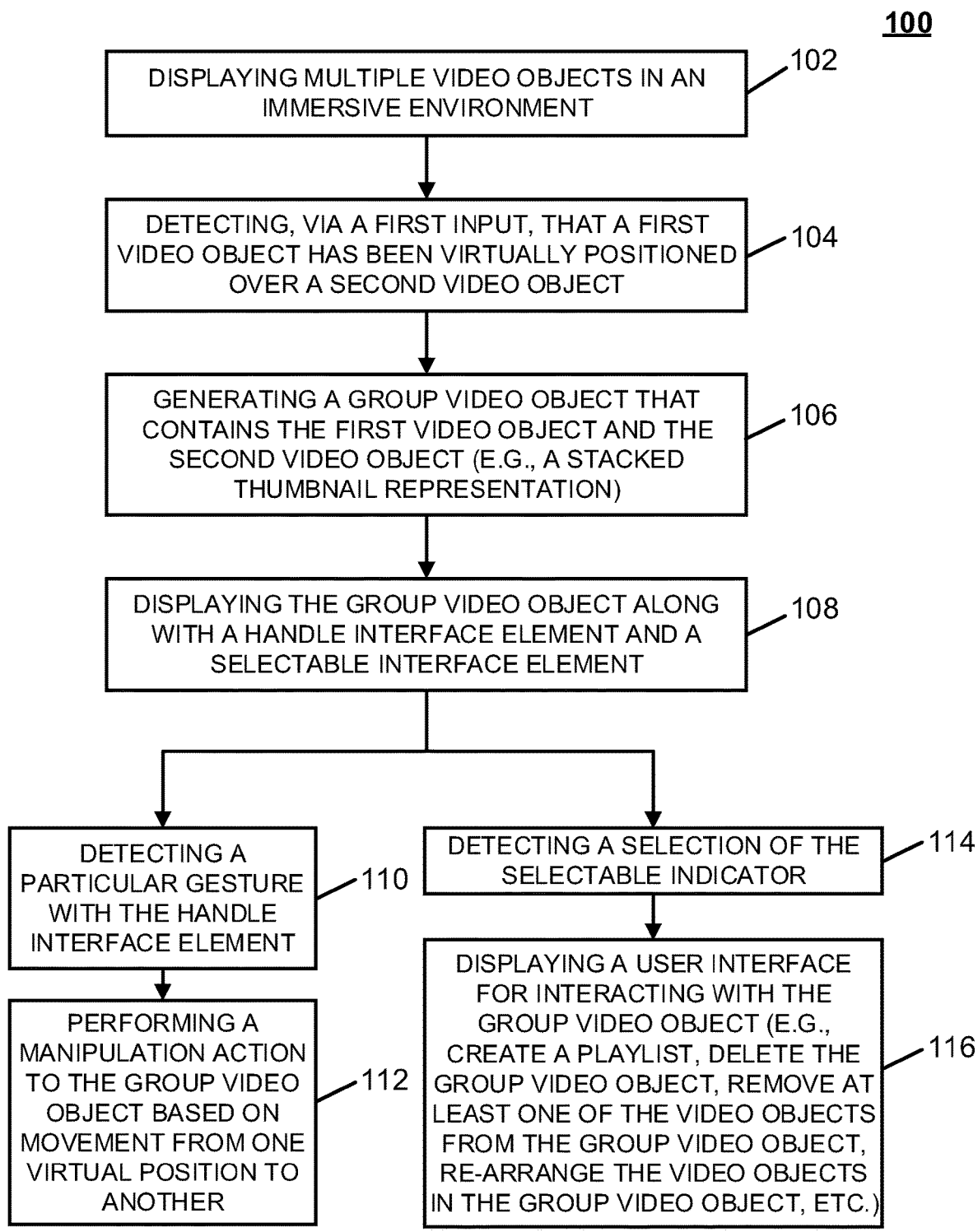
FIG. 1 shows an illustrative example of a process for object grouping and manipulation in immersive environments in accordance with some embodiments of the disclosed subject matter.

In accordance with various embodiments, mechanisms (which can include methods, systems, and media) for object grouping and manipulation in immersive environments are provided.

In some embodiments, the mechanisms described herein can provide a grouping interaction for creating and/or manipulating group video objects that includes one or more video objects in an immersive environment. For example, in an immersive environment including multiple video objects that are each represented by a thumbnail representation, the mechanisms can receive a user interaction in which a thumbnail representation of a first video object is placed onto a thumbnail representation of a second video object. In response to receiving the user interaction in which a thumbnail representation of a first video object is placed onto a thumbnail representation of a second video object, the mechanisms can create a group video object that includes the first video object and the second video object, where the group video object can be represented by a stacked thumbnail representation.

It should be noted that the stacked thumbnail representation can be generated using any suitable approach. For example, in response to receiving the user interaction in which a thumbnail representation of a first video object is placed onto a thumbnail representation of a second video object, the mechanisms can automatically align the thumbnail representations into a stacked thumbnail representation that represents the video objects contained in the group video object. In another example, in response to receiving the user interaction in which a thumbnail representation of a first video object is placed onto a thumbnail representation of a second video object, the mechanisms can present an animation that shows the first video object and the second video object being combined into the group video object.

It should also be noted that the stacked thumbnail representation can represent the group video object in any suitable approach. For example, the thumbnail representation of the first video object that was selected and manipulated over the thumbnail representation of the second video object can be positioned on the top of the stacked thumbnail representation such that the thumbnail representation of the first video object is presented as the first thumbnail representation in the stacked thumbnail representation. In another example, the first video object that was selected and manipulated over the second video object can be ordered as the last video object in the group video object represented by the stacked thumbnail representation. In yet another example, the stacked thumbnail representation can include a mosaic thumbnail view of each thumbnail representation or a screenshot of each video object included in the group video object. In a further example, the stacked thumbnail representation can rotate through each thumbnail representation of each video object included in the group video object.

In some embodiments, the stacked thumbnail representation of the group video object can be concurrently presented with a handle interface element. The handle interface element can, for example, allow the user to manipulate the group video object in the immersive environment. For example, the handle interface element can be interacted with in the immersive environment (e.g., using a grabbing hand motion) to move the group video object from one position to another. In another example, in response to receiving a particular gesture, such as a grabbing hand motion followed by a shaking hand motion, the mechanisms can cause the group video object to expand, thereby presenting thumbnail representations corresponding to the video objects that are contained within the group video object. In yet another example, in response to receiving a particular gesture, such as a grabbing hand motion (e.g., a first hand gesture with a palm facing down) followed by a palm up gesture, the mechanism can cause the group video object to be removed by ungrouping the group video object, thereby individually presenting each thumbnail representation of each video object contained within the group video object for interaction.

It should be noted that the handle interface element can be used in one or more playback states within the immersive environment. For example, the handle interface element can be presented along with a video object in an empty playing state that allows the user to place one or more thumbnail representations of video objects on to the video object that is currently in the empty playing state. In this example, the handle interface element can provide user with the ability to move the video object in the empty playing state to, for example, an area in which the user may place one or more thumbnail representations of video objects onto the video object in the empty playing state. In another example, the handle interface element can be presented along with a video object in a playback state that allows the user to move the video object that is currently being played back and/or add additional video objects into the group video object.

In some embodiments, the stacked thumbnail representation of the group video object can be concurrently presented with a counter element, any other suitable selectable identifier element, or any other suitable affordance element that that provides an entry point for interacting with the group video object. For example, the counter element can indicate a number of video objects that are contained within the group video object. In continuing this example, in response to receiving a user selection of a counter element corresponding to a group video object, the mechanisms can provide options for interacting with the group video object and/or each of the video objects contained within the group video object—e.g., deleting the group video object, converting the group video object to a playlist object that includes the video objects contained in the group video object, re-ordering or otherwise arranging the video objects contained in the group video object, presenting a grid view of the video objects contained in the group video object, presenting detailed information associated with each of the video objects contained in the group video object, removing at least one of the video objects contained in the group video object, providing a rating associated with at least one of the video objects contained in the group video object, etc.

It should be noted that, although the embodiments described herein generally relate to manipulating and/or interacting with group video objects that contain one or more videos, this is merely illustrative. For example, in some embodiments, the mechanisms can be used to manipulate and/or interact with virtual objects that corresponding to a suitable content item (e.g., a video file, an audio file, a television program, a movie, live-streamed media content, an animation, video game content, graphics, documents, and/or any other suitable media content). In another example, in some embodiments, the mechanisms can be used to manipulate group of applications that are represented by application icons in an operation system of an immersive environment. In continuing this example, multiple application icons can be placed into a group application object, where the group application object is concurrently presented with a handle interface element for manipulating the group application object and a counter element for indicating a number of applications contained within the group application object and for interacting with the group application object. In yet another example, in some embodiments, the mechanisms can be used to manipulate and/or otherwise interact with collections of content in an immersive environment. In continuing this example, multiple content files can be placed into a group content object, where the group content object is concurrently presented with a handle interface element for manipulating the group content object and a counter element for indicating a number of content files contained within the group content object and for interacting with the group content object.

These and other features for object grouping and manipulation in immersive environments are described further in connection with FIGS. 1-5.

Turning to FIG. 1, an illustrative example of a process for object grouping and manipulation in immersive environments is shown in accordance with some embodiments of the disclosed subject matter. In some embodiments, blocks of process 100 can be performed by any suitable device, such as a virtual reality headset, a head mounted display device, a game console, a mobile phone, a tablet computer, a television, and/or any other suitable type of user device.

At 102, process 100 can provide an immersive environment in which a user can interact with one or more virtual objects. For example, a user immersed in an augmented reality and/or a virtual reality environment wearing a head mounted display device can explore an immersive environment and interact with virtual objects and the like in the immersive environment through various different types of inputs. These inputs can include, for example, physical interactions including, for example, physical movement and/or manipulation of the head mounted display device and/or of an electronic device separate from the head mounted display device, and/or hand gestures, arm gestures, head movement, and/or head and/or eye directional gaze and the like. A user can implement one or more of these different types of interactions to execute a particular action to virtually move through the virtual environment, or from a first virtual environment to a second virtual environment. The movement through the virtual environment, or from one virtual environment to another, can include moving features of the virtual environment relative to the user, while the user remains stationary, to generate a perception of moving through the virtual environment.

Figure 2A:
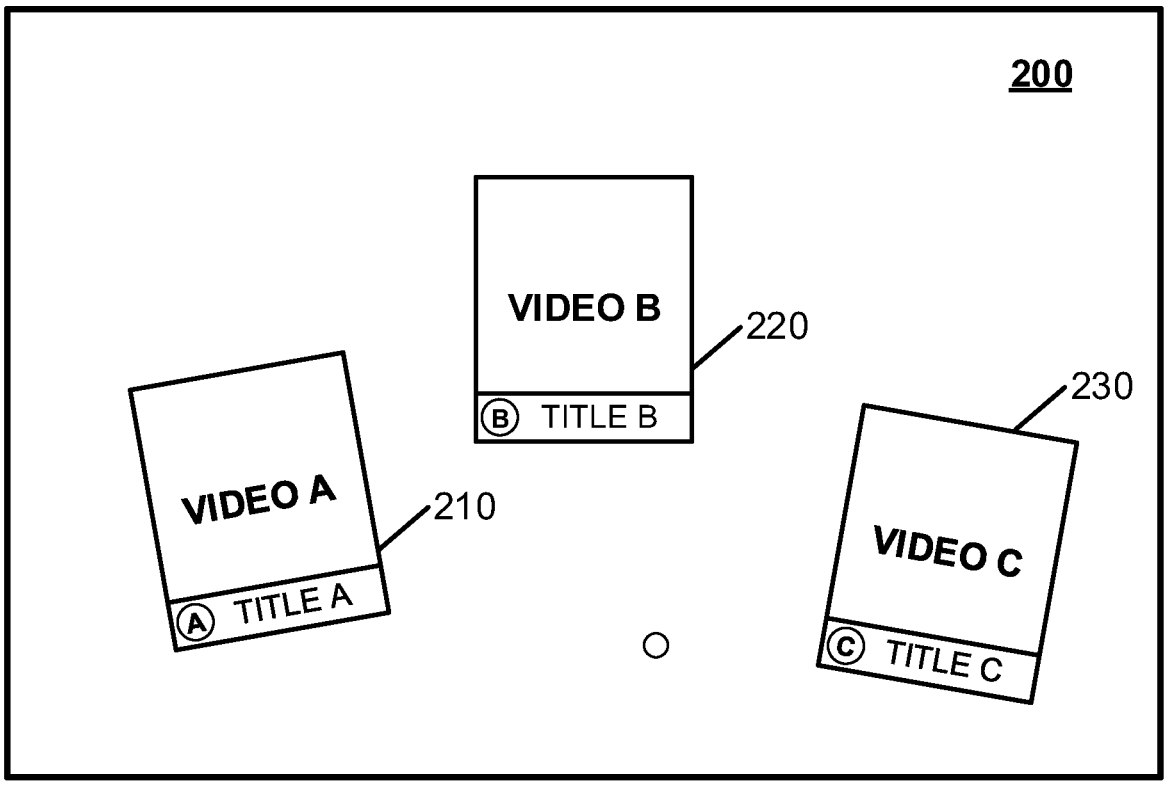
FIG. 2A shows an illustrative example of video objects in an immersive environment in accordance with some embodiments of the disclosed subject matter.

In a more particular example, the immersive environment can include one or more virtual video objects that correspond with videos (e.g., videos available for playback) and the user can interact with one or more of these virtual video objects. As shown in FIG. 2A, multiple virtual video objects 210, 220, and 230 that can be displayed within an immersive environment 200. As also shown in FIG. 2A, each of the virtual video objects 210, 220, and 230 can be represented by a thumbnail representation. The thumbnail representation can include, for example, a representative image (e.g., a screenshot) of the video corresponding to the virtual video object, a title of the video corresponding to the virtual video object, etc. It should be noted that the thumbnail representation can include any suitable content, such as metadata associated with the video corresponding to the virtual video object, creator information associated with the video corresponding to the virtual video object, keywords associated with the video corresponding to the virtual video object, etc. It should also be noted that the thumbnail representation can be displayed in any suitable manner. For example, in some embodiments, each virtual video object can be displayed as a volumetric thumbnail representation.

In this immersive environment, the user can interact with one or more of these video objects. For example, as shown in FIG. 2A-2H, the user can manipulate one or more of these video objects. In a more particular example, the user can direct a virtual beam or ray extending from a handheld electronic device that is connected to a head mounted display device toward a virtual video object to select or identify the virtual video object. In continuing with this example, the user can actuate a manipulation device or button of the handheld electronic device to indicate a selection of the virtual video object. In some embodiments, the user can provide a particular gesture (e.g., a gripping gesture) to physically grab a handle interface element for manipulating the virtual video object.

In some embodiments, at 104, process 100 can detect, via a first input, that a first video object has been virtually positioned over a second video object. For example, as shown in FIG. 2A, process 100 can detect, via a suitable input, that video object 210 has been selected and virtually positioned over video object 220. As mentioned above, the input can include manipulation of the head mounted display device and/or of an electronic device separate from the head mounted display device. For example, the user can direct a virtual beam or ray extending from a handheld electronic device that is connected to a head mounted display device toward a first video object to identify the virtual video object, provide a gripping gesture to select the first video object, and provide a dragging gesture that places the first video object over the second video object.

In some embodiments, in response to detecting that a first video object has been virtually positioned over a second video object, process 100 can generate a group video object that contains the first video object and the second video object at 106 and display the group video object in place of the first video object and the second video object at 108.

Figure 2B:
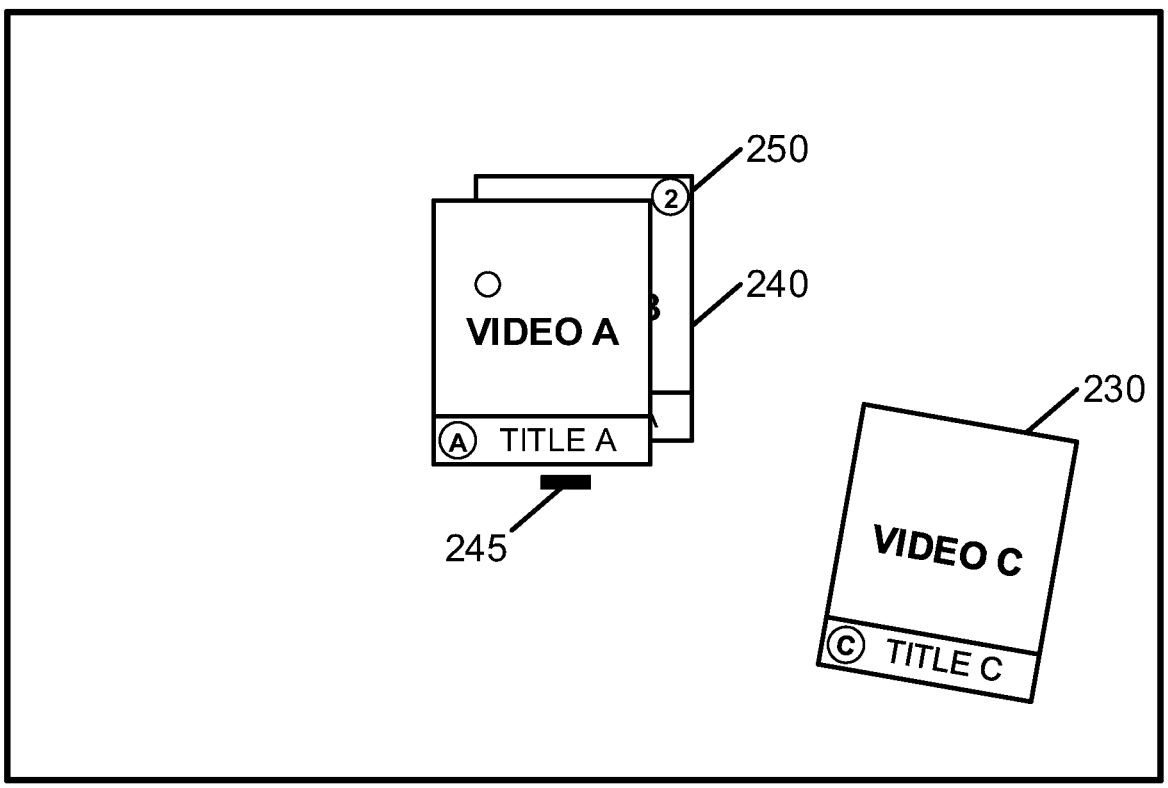
FIG. 2B shows an illustrative example of a generated group video object having a handle interface element and selectable indicator element in an immersive environment in accordance with some embodiments of the disclosed subject matter.

For example, as shown in FIG. 2B, process 100 can generate a group video object 240 that is represented by a stacked thumbnail representation while continuing to display the remaining video objects, such as video object 230. In a more particular example, as also shown in FIG. 2B, a first video object 210 can be represented by a first thumbnail representation, a second video object 220 can be represented by a second thumbnail representation, and a group video object 240 can be represented by a stacked thumbnail representation in which the first thumbnail representation and the second thumbnail representation can be automatically aligned to generate the stacked thumbnail representation. The stacked thumbnail representation that represents group video object 240 can include any suitable number of layers—e.g., two layers to indicate that it is a group video object containing multiple video objects, a layer corresponding to each video object contained in the group video object, etc.

Figure 2C:
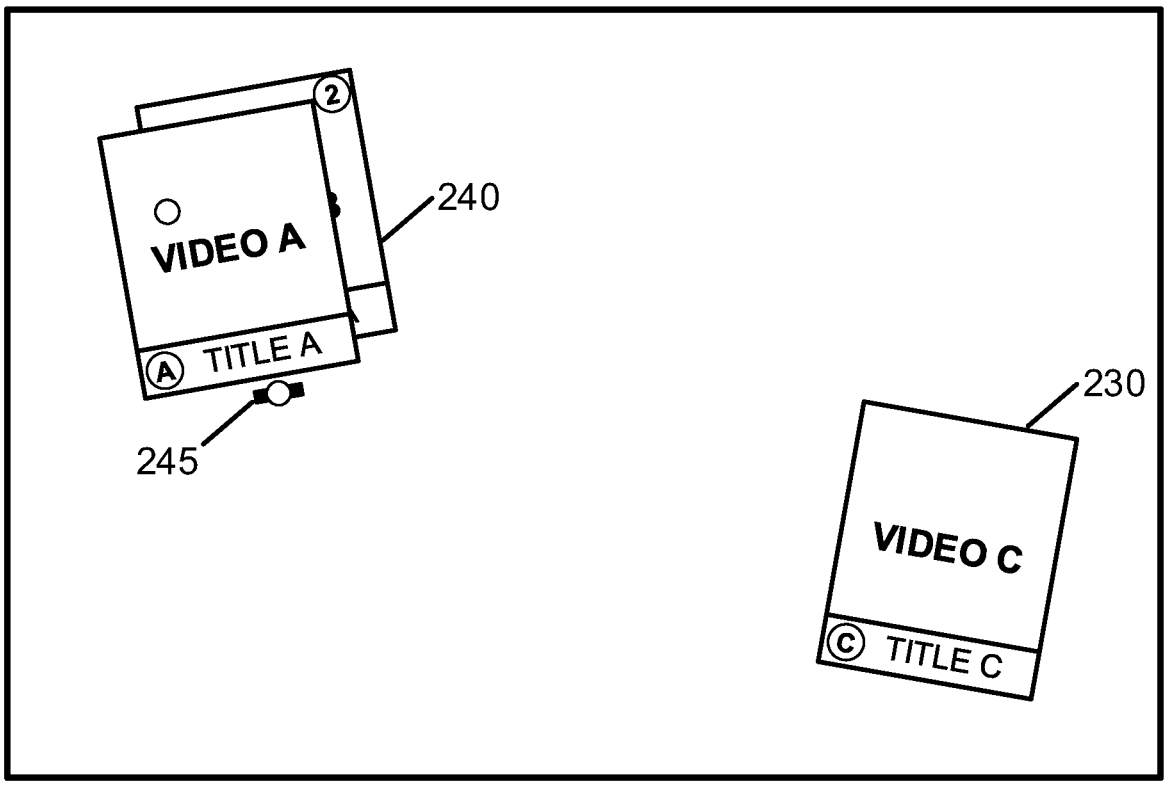
FIG. 2C shows an illustrative example of interactions with the generated group video object in an immersive environment using the handle interface element (e.g., detecting a hand gesture with the handle interface element, receiving a selection of the handle interface element using a ray-based controller, etc.) in accordance with some embodiments of the disclosed subject matter.
Figure 2D:
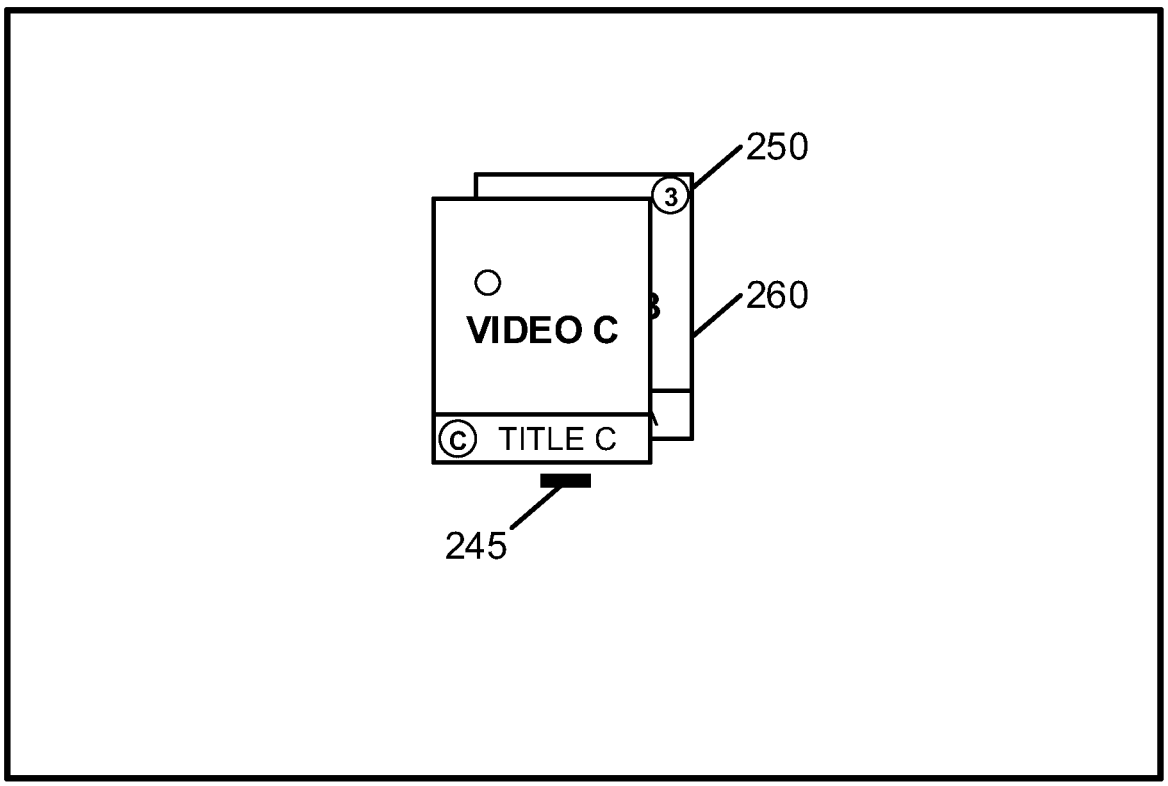
FIG. 2D shows an illustrative example of adding an additional video object from an immersive environment to a group video object in accordance with some embodiments of the disclosed subject matter.

In another example, as shown in FIG. 2D, in response to detecting that a third video object 230 has been virtually positioned over group video object 240, process 100 can generate an updated group video object 260 that is represented by a stacked thumbnail representation while continuing to display any remaining video objects, where group video object 260 contains first video object 210, second video object 220, and third video object 230.

Alternatively, in some embodiments, the generated group video object can be displayed in addition to the first video object and the second video object in the immersive environment. This can, for example, allow the user to manipulate video objects within the immersive environment to create different group video objects that each may contain one or more of the same video objects. In continuing this example, these group video objects can be converted to playlists that each contain one or more of the video objects displayed in the immersive environment, where some playlists may include the same content item.

It should be noted that the group video object can be represented in any suitable manner. For example, in response to detecting that first video object 210 was virtually positioned over second video object 220, a thumbnail representation of first video object 210 can be arranged in a top position of the group video object. In another example, in response to detecting that first video object 210 was virtually positioned over second video object 220, a thumbnail representation of first video object 210 can be ordered as the last video object in the group video object represented by the stacked thumbnail representation. In yet another example, in response to detecting that first video object 210 was virtually positioned over second video object 220, the stacked thumbnail representation can include a mosaic thumbnail view of each thumbnail representation or a screenshot of each video object included in the group video object. In a further example, the stacked thumbnail representation can rotate through each thumbnail representation of each video object included in the group video object. It should be noted that process 100 can use any suitable criterion to arrange the video objects contained within the group video object (e.g., popularity of each video, view count of each video, rating of each video, etc.).

In some embodiments, the group video object can be displayed along with a handle interface element. For example, as shown in FIG. 2B, handle interface element 245 can be a three-dimensional handle element that is displayed along with the group video object. Handle interface element 245 can allow the user to interact with the group video object by receiving a particular gesture with handle interface element 245. For example, using handle interface element 245, the corresponding group video object can be manipulated—e.g., picked up, thrown, re-positioned, placed on a dashboard interface, etc. In a more particular example, FIG. 2C shows an illustrative example where, in response to receiving a grab gesture or any other suitable gesture to indicate interaction with group video object 240, handle interface element 245 can be used to virtually move group video object 240 from a first position to a second position.

Referring back to FIG. 1, process 100 can detect that a particular gesture has been received with the handle interface element at 110 and, in response to receiving a particular gesture, process 100 can determine a particular manipulation action and perform the particular manipulation action at 112.

For example, as shown in FIG. 2C, handle interface element 245 can be used to virtually move the group video object from one virtual position to another. It should be noted that handle interface element 245 can be responsive to different gestures. For example, in some embodiments, in response to receiving a hand gesture in which the palm turns over, handle interface element 245 can cause the group video object to be deleted where the video objects contained in the group video object are displayed in the immersive environment. In another example, in some embodiments, in response to receiving a shaking or side-to-side hand gesture while engaging with handle interface element 245, handle interface element 245 can cause the group video object to expand to display the video objects contained in the group video object. In yet another example, in some embodiments, in response to receiving an up and down hand gesture while engaging with handle interface element 245, handle interface element 245 can cause the last added video object to be removed from the group video object (e.g., with an animation in which the video object pops out of the group video object).

It should be noted that handle interface element 245 can be displayed with group video objects in any suitable state.

Figure 3A:
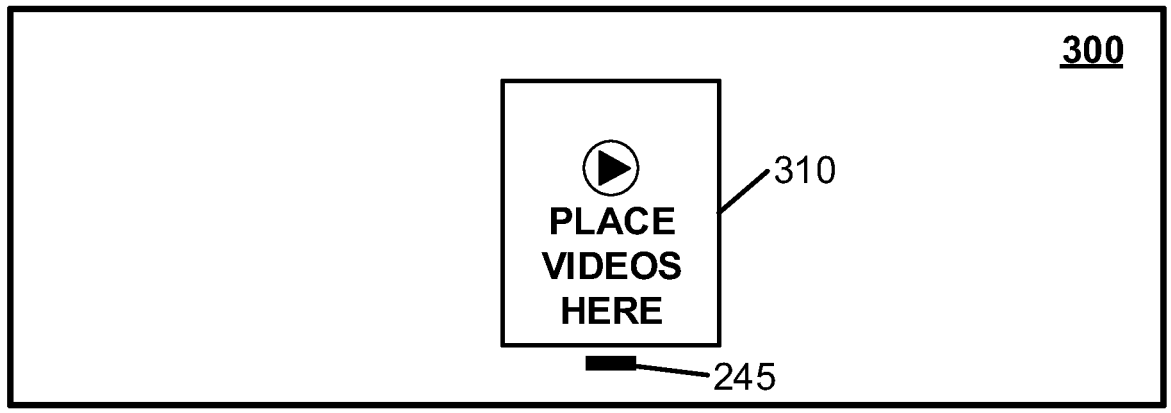
FIG. 3A shows an illustrative example of an immersive environment including a group video object in an empty state for receiving one or more video objects, where the handle interface element provides an interface for interacting with or manipulating the group video object, in accordance with some embodiments of the disclosed subject matter.

FIG. 3A shows an illustrative example of a group video object 310 in an empty state for placing video objects in an immersive environment 300, where handle interface element 245 provides an interface for interacting with or manipulating group video object 310, in accordance with some embodiments of the disclosed subject matter. As also shown in FIG. 3A, the user navigating the immersive environment can be prompted to interact with a group video object that is currently in an empty state, where the group video object indicates that it is in an empty state by presenting a message, such as "place videos here." In continuing this example, a user can interact with video objects or other suitable virtual objects and place, throw, or otherwise move these video objects onto group video object 310 that is currently in an empty state. In response, the video objects can be added into group video object 310 (e.g., where the thumbnail representations of each video object are automatically aligned into a stacked thumbnail representation).

Figure 3B:
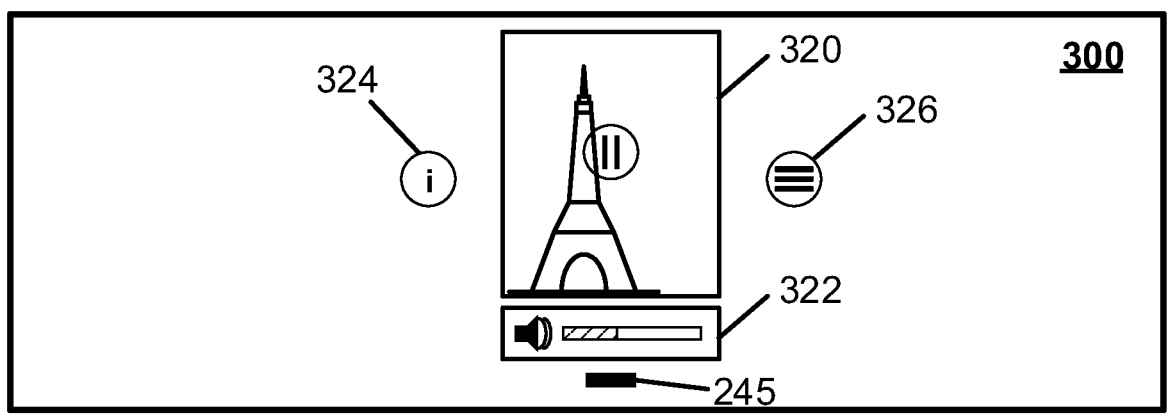
FIG. 3B shows an illustrative example of an immersive environment including a group video object in a thumbnail playing state for playing back video objects contained in the group video object, where the handle interface element provides an interface for interacting with or manipulating the group video object, in accordance with some embodiments of the disclosed subject matter.

FIG. 3B shows an illustrative example of group video object 320 in a thumbnail state in which a video object has been added to group video object 310 of FIG. 3A that was in an empty state in accordance with some embodiments of the disclosed subject matter. Similar to FIG. 3A, group video object 320 can continue to be displayed with handle interface element 245, which provides an interface for interacting with or manipulating group video object 320. As also shown in FIG. 3B, the user can interact with group video object 320, where the video objects contained in group video object 320 can be played back in the thumbnail state. For example, in response to selecting group video object 320, group video object 320 can toggle between playing back and pausing the one or more videos contained in group video object 320.

In addition, in some embodiments, a playback options interface 322 can be presented to allow the user to modify the playback controls of the video—e.g., play, pause, fast forward, rewind, repeat, increase volume, decrease volume, etc. It should be noted that playback options interface 322 can include any suitable playback options, such as a timeline that a user can manipulate using any suitable gesture or input to select a particular playback position of the video contained in the group video object. It should also be noted that playback options interface 322 can include any suitable navigation options for navigating through the videos contained in the group video object (e.g., navigate to a previous video, navigate to a next video, automatically scroll through the videos contained in the group video object, etc.).

In some embodiments, the thumbnail state of group video object 320 can also include an additional media information interface 322 and/or a related media interface 324.

Figure 3C:
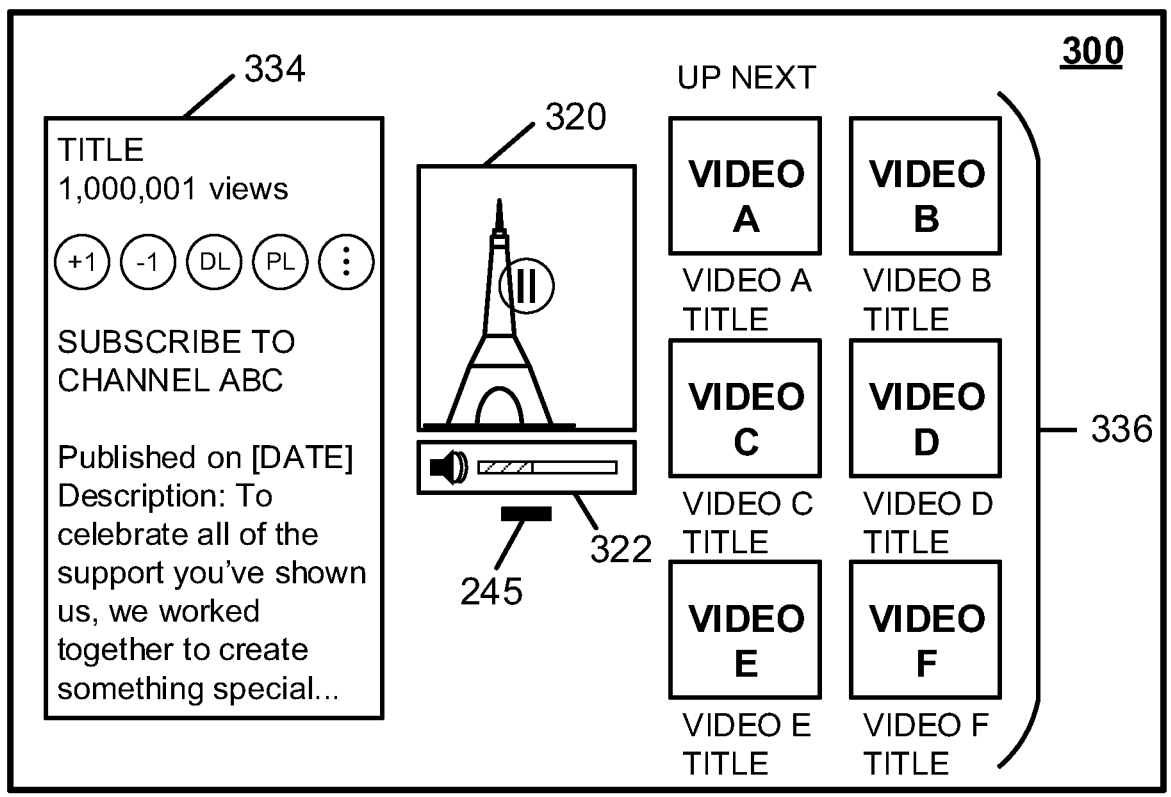
FIG. 3C shows an illustrative example of an immersive environment including a group video object in a thumbnail playing state along with additional content information, where the handle interface element provides an interface for interacting with or manipulating the group video object, in accordance with some embodiments of the disclosed subject matter.

For example, as shown in FIG. 3C, in response to selecting additional media information interface 322 of FIG. 3B, a user interface 332 that includes any suitable information relating to the video being played back can be presented. In a more particular example, as shown in FIG. 3C, user interface 332 can include title information corresponding to the video being played back in the thumbnail state, options for rating the video being played back in the thumbnail state (e.g., a thumbs up option, a thumbs down option, a number of received thumbs up ratings, a number of received thumbs down ratings, etc.), options for downloading the video being played back in the thumbnail state, options for adding the video being played back in the thumbnail state into a playlist, options for queueing the video being played back in the thumbnail state for playback at a later time, options to subscribe to a channel associated with a content creator of the video being played back in the thumbnail state, options to subscribe to a channel that includes the video being played back in the thumbnail state, publication information corresponding to the video being played back in the thumbnail state, a detailed description of the video being played back in the thumbnail state (e.g., that was provided by the content creator), etc. It should be noted that user interface 332 can include any suitable information relating to the video being played back in the thumbnail state, such as comments provided by viewing users.

In another example, as also shown in FIG. 3C, in response to selecting related media interface 324 of FIG. 3B, a user interface 336 that includes content items that are related to the video being played back can be presented (e.g., Video A through Video F). In continuing this example, a user can interact with one of the related content items to, for example, play back a related video in the thumbnail state, add a related video to a group video object (e.g., by providing a grab gesture to one of the related video objects and throwing the related video object onto the group video object), receive additional information about the related content item, etc.

Referring back to FIG. 1, additionally or alternatively to displaying the group video object along with a handle interface element, process 100 can also present the group video object along with a selectable indicator element for interacting with the group video object at 108. For example, as shown in FIG. 2B, a selectable indicator element 250 can be presented in the top right corner of group video object 240, where selectable indicator element 250 can, upon selection, provide the user with an entry point to reviewing, modifying, and/or otherwise interacting with the group video object and the video objects contained within the group video object.

In some embodiments, selectable indicator element 250 can be displayed as a video counter of the number of video objects contained in the group video object. For example, as shown in FIGS. 2A and 2B, in response to detecting that first video object 210 has been virtually positioned over second video object 220, process 100 can generate group video object 240 in which selectable indicator element 250 is positioned in the top right corner of group video object 240 and in which selectable indicator element 250 is represented as a video count of 2 to indicate that there are two videos contained in the group video object. In another example, as shown in FIG. 2D, in response to detecting that first video object 230 has been virtually positioned over group video object 240, process 100 can generate or update group video object 260 in which selectable indicator element 250 is positioned in the top right corner of group video object 260 and in which selectable indicator element 250 is represented as a video count of 3 to indicate that there are three videos contained in the group video object.

It should be noted that selectable indicator element 250 can be positioned at any suitable location of group video object 240. For example, in some embodiments, selectable indicator element 250 can be centered along the top border of group video object 240. In another example, in some embodiments, selectable indicator element 250 can be positioned on the top left corner of group video object 240.

It should also be noted that, in some embodiments, the stacked thumbnail representation of group video object 240 can remain the same size or the same volume while selectable indicator element 250 can be incremented or decremented to indicate the number of video objects contained within group video object 240. Alternatively, in some embodiments, the stacked thumbnail representation of group video object 240 can remain relatively the same size while expanding in depth to approximately indicate the number of video objects contained within group video object 240 (e.g., a stacked thumbnail representation with ten layers as opposed to two layers in the stack).

Turning back to FIG. 1, in some embodiments, in response to detecting a selection of the selectable indicator element at 114, process 100 can display a user interface that includes one or more options for interacting with a group video object at 116. For example, in response to receiving a suitable gesture or receiving a suitable input using an electronic device that is separate from a head mounted display device, process can display a corresponding user interface within the immersive environment for interacting with the group video object. In a more particular example, in response to receiving a hand gesture in which a finger presses a selectable indicator element on the group video object, a user interface can slide out from the group video object for interacting with the group video object.

Figure 2E:
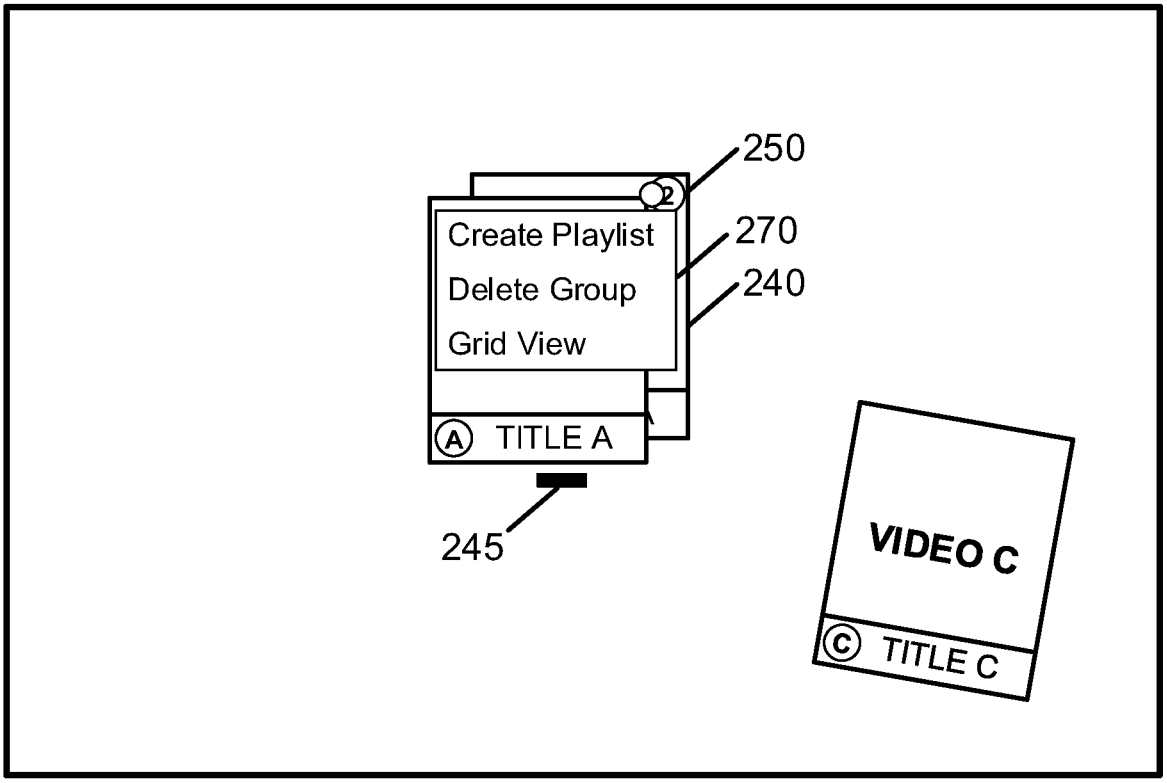
FIG. 2E shows an illustrative example of a user interface that is presented in response to interacting with the selectable indicator element of the group video object in accordance with some embodiments of the disclosed subject matter.

For example, as shown in FIG. 2E, in response to detecting a user interaction that selects selectable indicator element 250, process 100 can present a user interface 270 that includes an option for creating a playlist with the videos contained in group video object 240, an option for deleting group video object 240, and an option for displaying a grid view of the video objects contained in group video object 240.

Figure 2F:
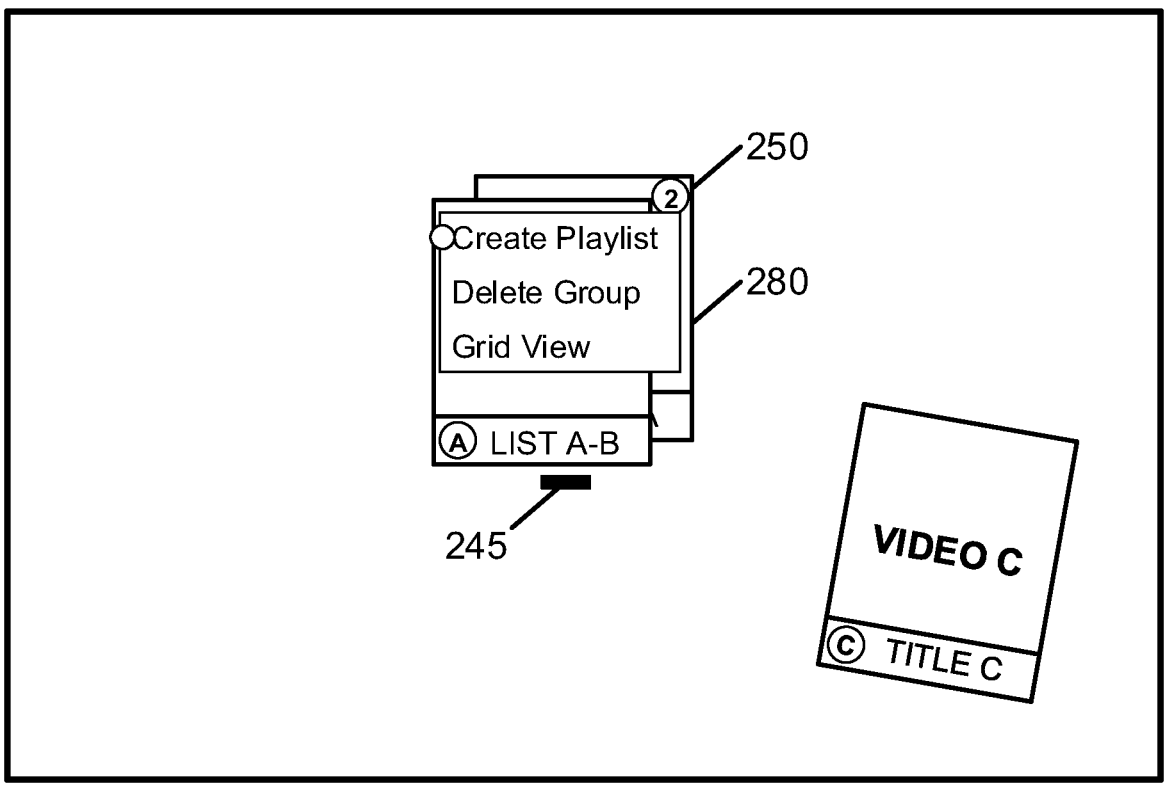
FIG. 2F shows an illustrative example of creating a playlist from the group video object in an immersive environment in accordance with some embodiments of the disclosed subject matter.

In some embodiments, in response to detecting a user interaction that selects the option for creating a playlist with the videos contained in group video object 240, group video object 240 can be converted to a playlist object 280. For example, as shown in FIG. 2F, in response to detecting a user interaction that selects the option for creating a playlist with the videos contained in group video object 240, the video objects contained within group video object 240 are converted to playlist object 280, where the stacked thumbnail representation of group video object 240 that is currently being identified by VIDEO A as the topmost video (e.g., "TITLE A" of VIDEO A on the stacked thumbnail representation) is replaced by a playlist title (e.g., "LIST A-B"). Additionally, in some embodiments, playlist object 280 can include additional metadata associated with each video in the playlist (e.g., title information, creator information, timing information, source information, etc.).

In some embodiments, in response to detecting a user interaction that selects the option for deleting group video object 240, group video object 240 can be removed from the immersive environment. For example, group video object 240 and the video objects contained within group video object 240 can be removed from the immersive environment. In another example, group video object 240 can be removed and the video objects contained within group video object 240 can be individually displayed in the immersive environment. In yet another example, group video object 240 can be presented in an empty state (e.g., with a "place videos here" message) and the video objects previously contained within group video object 240 can be positioned in a remote region of the immersive environment (e.g., tossed aside).

In some embodiments, in response to detecting a user interaction that selects the option for displaying a grid view of the video objects contained in group video object 240, group video object 240 can provide a detailed user interface that shows the videos contained within group video object 240.

Figure 2G:
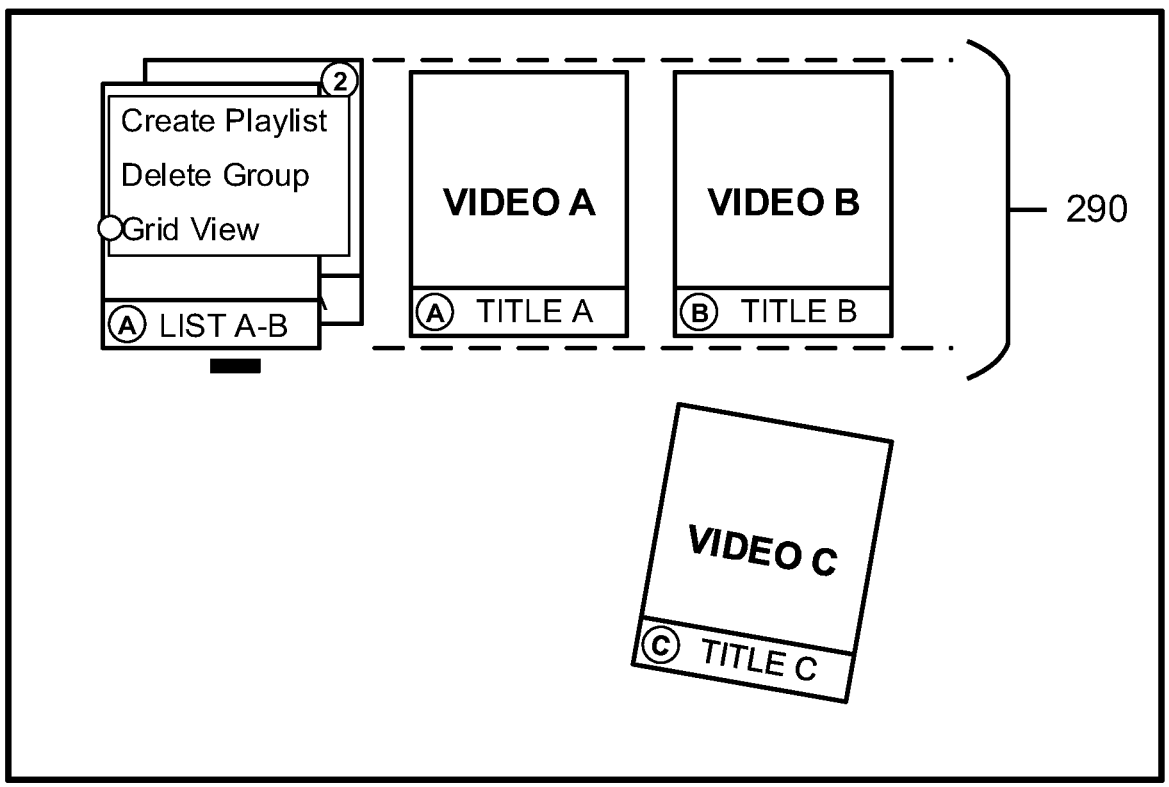
FIG. 2G shows an illustrative example of a grid interface that is presented to modify (e.g., add, remove, re-arrange, etc.) the video objects contained in the group video object in accordance with some embodiments of the disclosed subject matter.

For example, as shown in FIG. 2G, in response to detecting a user interaction that selects the option for displaying a grid view of the video objects contained in group video object 240, group video object 240 can horizontally expand to provide a detailed user interface 290 that shows VIDEO A and VIDEO B contained within group video object 240. In continuing this example, user interface 290 can provide a scrollable grid view of the video objects contained in group video object 240, where the user can manipulate user interface 290 to scroll sequentially through the video objects contained in group video object 240.

Figure 2H:
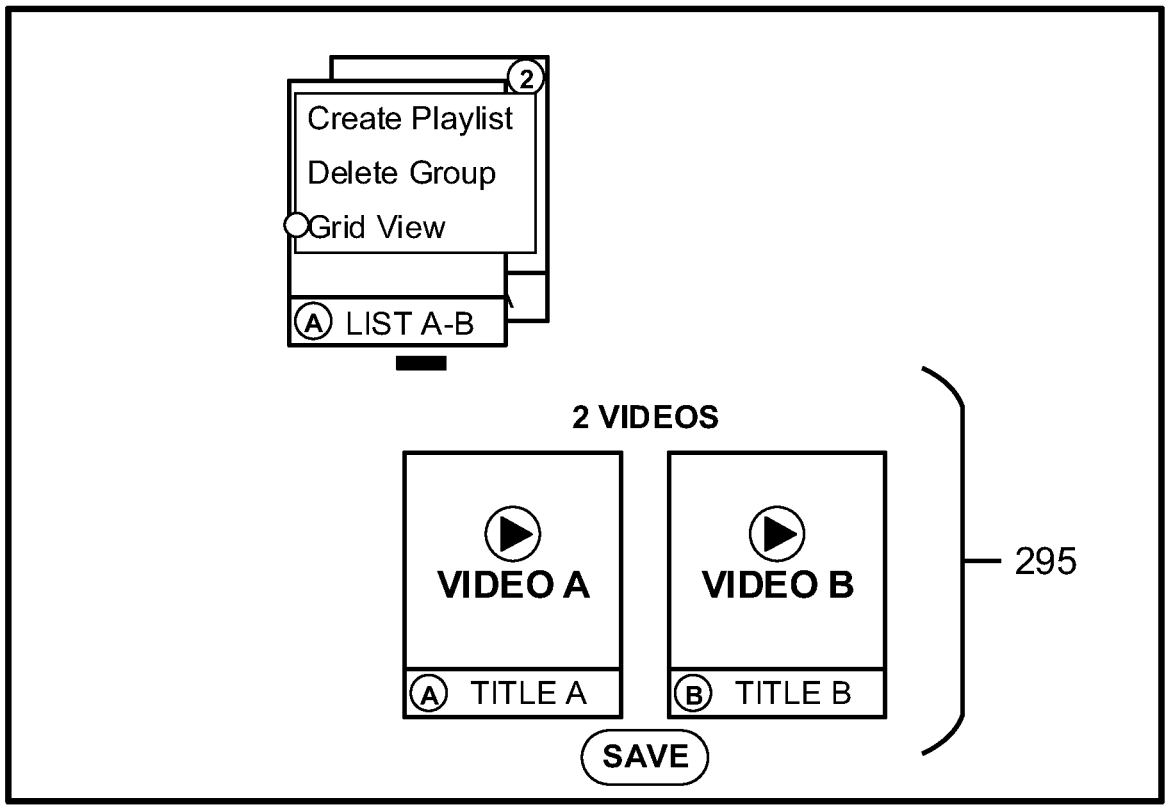
FIG. 2H shows an illustrative example of a grid interface that is presented to modify (e.g., add, remove, re-arrange, etc.) the video objects contained in the group video object in accordance with some embodiments of the disclosed subject matter.

In another example, as shown in FIG. 2H, in response to detecting a user interaction that selects the option for displaying a grid view of the video objects contained in group video object 240, a detailed user interface 295 that shows VIDEO A and VIDEO B contained within group video object 240 and that shows the number of videos contained within group video object 240.

In these user interfaces, the user can review each video and/or additional information relating to each video contained within group video object 240, provide an input for re-arranging the order of the videos contained within group video object 240, provide an input for removing at least one video from group video object 240, convert group video object 240 to a playlist object, etc. For example, in some embodiments, hand gestures can be received for manipulating group video object 240 by removing and/or re-arranging videos contained in group video object 240 by directly manipulating the video objects with the hands of the user.

In some embodiments, in response to detecting a user interaction that selects selectable indicator element 250 while a detailed user interface (e.g., detailed user interface 290 of FIG. 2G, detailed user interface 295 of FIG. 2H), process 100 can close or otherwise collapse the user interfaces and revert back to the stacked thumbnail representation of group video object 240 (e.g., including a handle interface element and a selectable indicator element). Alternatively, in some embodiments, process 100 can close or otherwise collapse the user interfaces and revert back to the stacked thumbnail representation of group video object 240 (e.g., including a handle interface element and a selectable indicator element) in response to detecting a user interaction that selects a save option or other suitable option within a detailed user interface (e.g., detailed user interface 290 of FIG. 2G, detailed user interface 295 of FIG. 2H).

Figure 4:
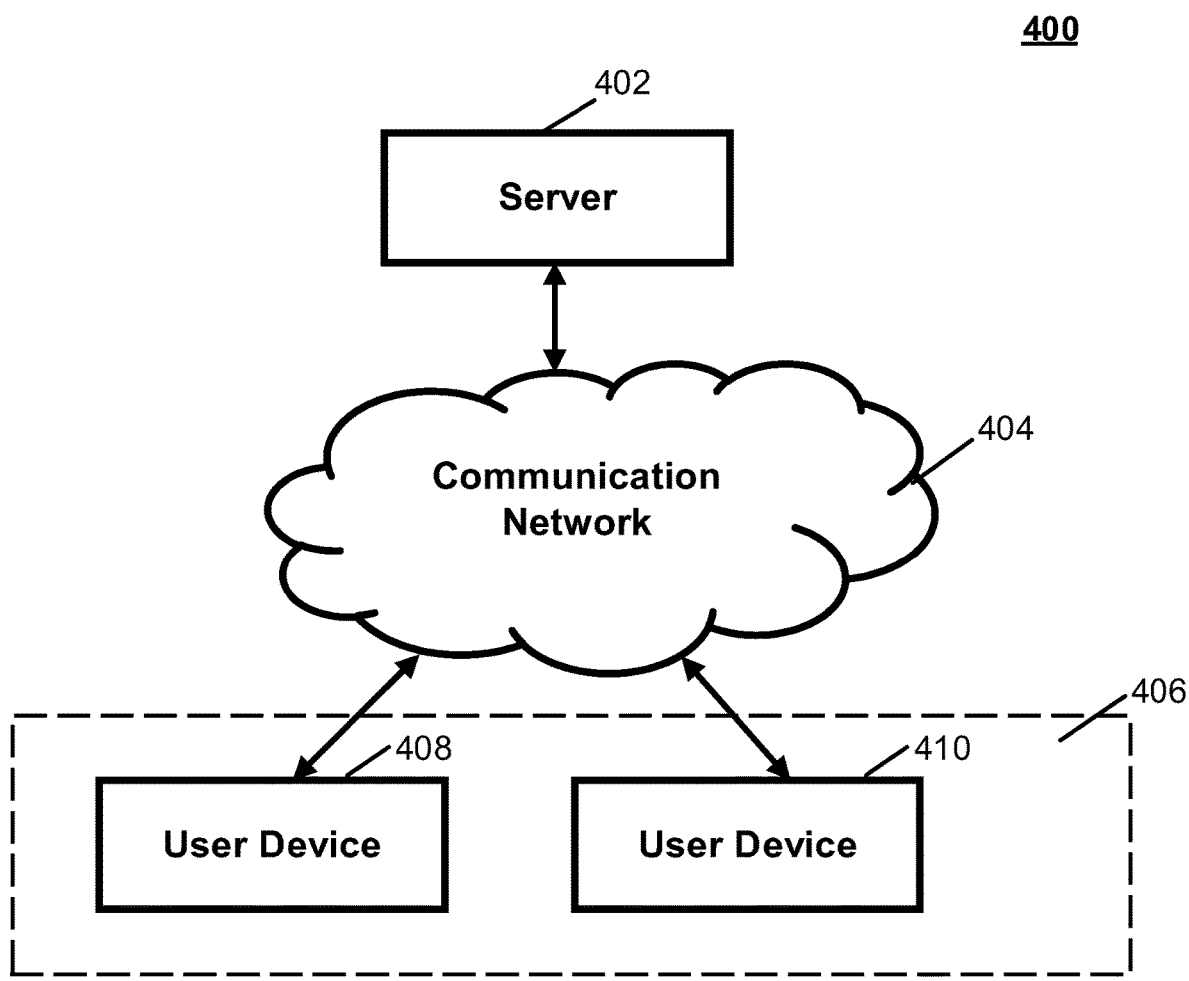
FIG. 4 shows a schematic diagram of an illustrative system suitable for implementation of mechanisms described herein for object grouping and manipulation in immersive environments in accordance with some embodiments of the disclosed subject matter.
Figure 5:
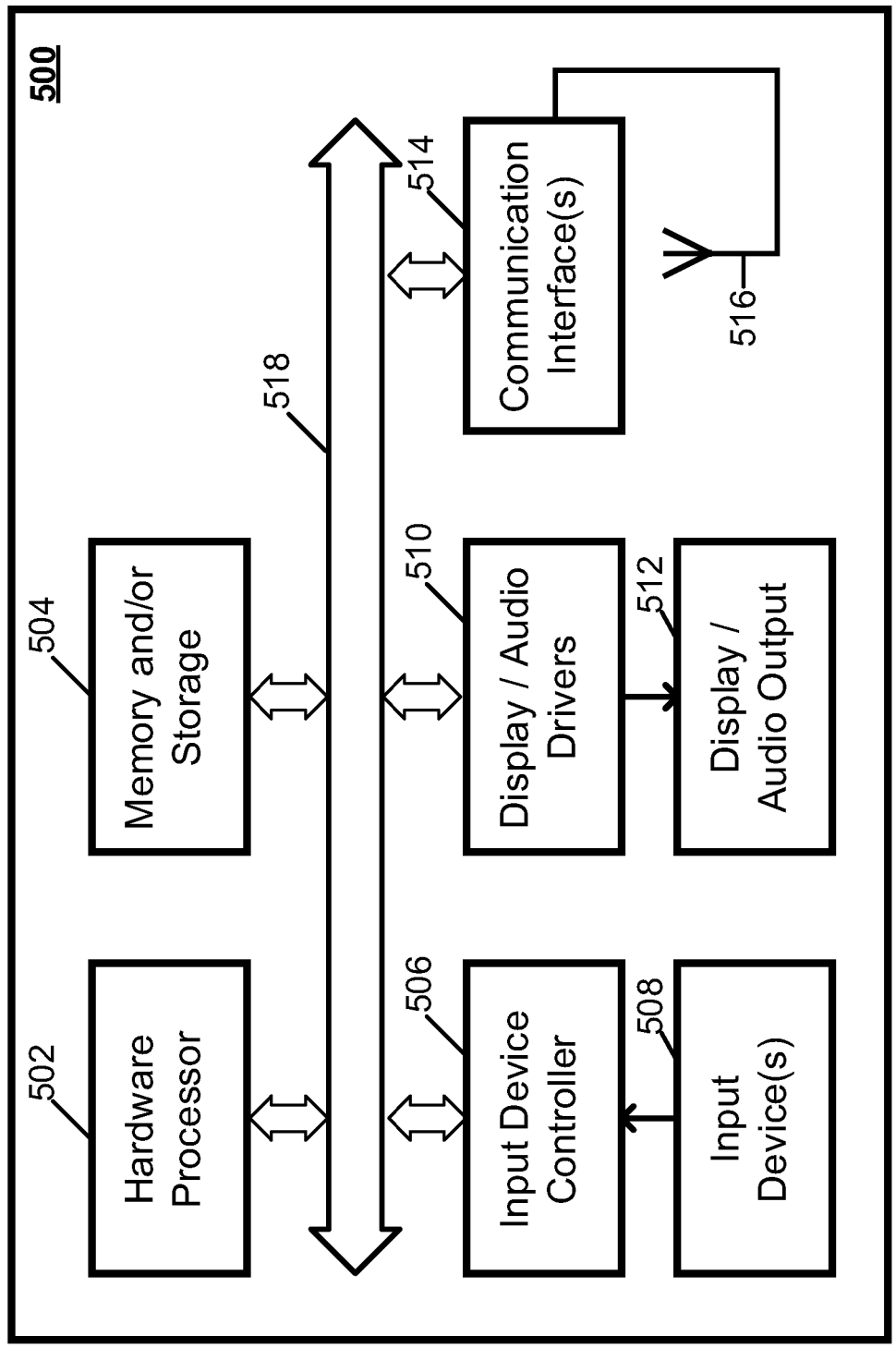
FIG. 5 shows a detailed example of hardware that can be used in a server and/or a user device of FIG. 4 in accordance with some embodiments of the disclosed subject matter.

Turning to FIG. 4, an illustrative example 400 of hardware for object grouping and manipulation in immersive environments that can be used in accordance with some embodiments of the disclosed subject matter is shown. As illustrated, hardware 400 can include a content server 402, a communication network 404, and/or one or more user devices 406, such as user devices 408 and 410.

Content server 402 can be any suitable server(s) for storing and/or providing media content to user devices 406. For example, in some embodiments, content server 402 can store media content, such as videos, television programs, movies, live-streamed media content, audio content, animations, video game content, graphics, and/or any other suitable media content. In some embodiments, content server 402 can transmit media content to user devices 406, for example, via communication network 404. In some embodiments, content server 402 can store video content (e.g., live video content, computer-generated video content, and/or any other suitable type of video content) in association with any suitable information to be used by a client device (e.g., user device 406) to render the video content as immersive content. In some embodiments, content server 402 can transmit virtual object that are represented by thumbnail representations of content items, such as videos.

Communication network 404 can be any suitable combination of one or more wired and/or wireless networks in some embodiments. For example, communication network 404 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 406 can be connected by one or more communications links (e.g., communications links 412) to communication network 404 that can be linked via one or more communications links (e.g., communications links 414) to content server 402. The communications links can be any communications links suitable for communicating data among user devices 406 and content server 402, such as network links, dial-up links, wireless links, hard-wired links, any other suitable communications links, or any suitable combination of such links.

User devices 406 can include any one or more user devices suitable for requesting video content, rendering the requested video content as immersive video content (e.g., as virtual reality content, as three-dimensional content, as 360-degree video content, as 180-degree video content, and/or in any other suitable manner) and/or for performing any other suitable functions. For example, in some embodiments, user devices 406 can include a mobile device, such as a mobile phone, a tablet computer, a wearable computer, a laptop computer, a virtual reality headset, a vehicle (e.g., a car, a boat, an airplane, or any other suitable vehicle) information or entertainment system, and/or any other suitable mobile device and/or any suitable non-mobile device (e.g., a desktop computer, a game console, and/or any other suitable non-mobile device). As another example, in some embodiments, user devices 406 can include a media playback device, such as a television, a projector device, a game console, desktop computer, and/or any other suitable non-mobile device.

In a more particular example where user device 406 is a head mounted display device that is worn by the user, user device 406 can include a head mounted display device that is connected to a portable handheld electronic device. The portable handheld electronic device can be, for example, a controller, a smartphone, a joystick, or another portable handheld electronic device that can be paired with, and communicate with, the head mounted display device for interaction in the immersive environment generated by the head mounted display device and displayed to the user, for example, on a display of the head mounted display device.

It should be noted that the portable handheld electronic device can be operably coupled with, or paired with the head mounted display device via, for example, a wired connection, or a wireless connection such as, for example, a WiFi or Bluetooth connection. This pairing, or operable coupling, of the portable handheld electronic device and the head mounted display device can provide for communication between the portable handheld electronic device and the head mounted display device and the exchange of data between the portable handheld electronic device and the head mounted display device. This can allow, for example, the portable handheld electronic device to function as a controller in communication with the head mounted display device for interacting in the immersive virtual environment generated by the head mounted display device. For example, a manipulation of the portable handheld electronic device, and/or an input received on a touch surface of the portable handheld electronic device, and/or a movement of the portable handheld electronic device, can be translated into a corresponding selection, or movement, or other type of interaction, in the virtual environment generated and displayed by the head mounted display device.

It should also be noted that, in some embodiments, the portable handheld electronic device can include a housing in which internal components of the device are received. A user interface can be provided on the housing, accessible to the user. The user interface can include, for example, a touch sensitive surface configured to receive user touch inputs, touch and drag inputs, and the like. The user interface can also include user manipulation devices, such as, for example, actuation triggers, buttons, knobs, toggle switches, joysticks and the like.

It should further be noted that, in some embodiments, the head mounted display device can include a housing coupled to a frame, with an audio output device including, for example, speakers mounted in headphones, also coupled to the frame. For example, a front portion of the housing can be rotated away from a base portion of the housing so that some of the components received in the housing are visible. A display can be mounted on an interior facing side of the front portion of the housing. In some embodiments, lenses can be mounted in the housing, between the user's eyes and the display when the front portion is in the closed position against the base portion of the housing. The head mounted display device can include a sensing system including various sensors and a control system including a processor and various control system devices to facilitate operation of the head mounted display device.

For example, in some embodiments, the sensing system can include an inertial measurement unit including various different types of sensors, such as, for example, an accelerometer, a gyroscope, a magnetometer, and other such sensors. A position and orientation of the head mounted display device can be detected and tracked based on data provided by the sensors included in the inertial measurement unit. The detected position and orientation of the head mounted display device can allow the system to, in turn, detect and track the user's head gaze direction, and head gaze movement, and other information related to the position and orientation of the head mounted display device.

In some implementations, the head mounted display device can include a gaze tracking device including, for example, one or more sensors to detect and track eye gaze direction and movement. Images captured by the sensor(s) can be processed to detect and track direction and movement of the user's eye gaze. The detected and tracked eye gaze can be processed as a user input to be translated into a corresponding interaction in the immersive virtual experience. A camera can capture still and/or moving images that can be used to help track a physical position of the user and/or other external devices in communication with/operably coupled with the head mounted display device. The captured images can also be displayed to the user on the display in a pass through mode.

Although content server 402 is illustrated as one device, the functions performed by content server 402 can be performed using any suitable number of devices in some embodiments. For example, in some embodiments, multiple devices can be used to implement the functions performed by content server 402. In a more particular example, in some embodiments, a first content server can storage media content items and respond to requests for media content and a second content server can generate thumbnail representations of virtual objects that correspond to a requested media content item.

Although two user devices 408 and 410 are shown in FIG. 4 to avoid over-complicating the figure, any suitable number of user devices, and/or any suitable types of user devices, can be used in some embodiments.

Content server 402 and user devices 406 can be implemented using any suitable hardware in some embodiments. For example, in some embodiments, devices 402 and 406 can be implemented using any suitable general purpose computer or special purpose computer. For example, a mobile phone may be implemented using a special purpose computer. Any such general purpose computer or special purpose computer can include any suitable hardware. For example, as illustrated in example hardware 500 of FIG. 5, such hardware can include hardware processor 502, memory and/or storage 504, an input device controller 506, an input device 508, display/audio drivers 510, display and audio output circuitry 512, communication interface(s) 514, an antenna 516, and a bus 518.

Hardware processor 502 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 502 can be controlled by a server program stored in memory and/or storage 504 of a server (e.g., such as content server 402). For example, in some embodiments, the server program can cause hardware processor 502 to transmit a media content item to user device 206, transmit instructions for presenting rendering a video stream as immersive video content, and/or performing any other suitable actions. In some embodiments, hardware processor 502 can be controlled by a computer program stored in memory and/or storage 504 of user device 406. For example, the computer program can cause hardware processor 502 to render a video stream as immersive video content, and/or perform any other suitable actions.

Memory and/or storage 504 can be any suitable memory and/or storage for storing programs, data, media content, and/or any other suitable information in some embodiments. For example, memory and/or storage 504 can include random access memory, read-only memory, flash memory, hard disk storage, optical media, and/or any other suitable memory.

Input device controller 506 can be any suitable circuitry for controlling and receiving input from one or more input devices 508 in some embodiments. For example, input device controller 506 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 510 can be any suitable circuitry for controlling and driving output to one or more display/audio output devices 512 in some embodiments. For example, display/audio drivers 510 can be circuitry for driving a touchscreen, a flat-panel display, a cathode ray tube display, a projector, a speaker or speakers, and/or any other suitable display and/or presentation devices.

Communication interface(s) 514 can be any suitable circuitry for interfacing with one or more communication networks, such as network 404 as shown in FIG. 4. For example, interface(s) 514 can include network interface card circuitry, wireless communication circuitry, and/or any other suitable type of communication network circuitry.

Antenna 516 can be any suitable one or more antennas for wirelessly communicating with a communication network (e.g., communication network 204) in some embodiments. In some embodiments, antenna 516 can be omitted.

Bus 518 can be any suitable mechanism for communicating between two or more components 502, 504, 506, 510, and 514 in some embodiments.

Any other suitable components can be included in hardware 500 in accordance with some embodiments.

In some embodiments, at least some of the above described blocks of the processes of FIG. 1 can be executed or performed in any order or sequence not limited to the order and sequence shown in and described in connection with the figures. Also, some of the above blocks of FIG. 1 can be executed or performed substantially simultaneously where appropriate or in parallel to reduce latency and processing times. Additionally or alternatively, some of the above described blocks of the processes of FIG. 1 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for object grouping and manipulation in immersive environments are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for interacting with immersive video content, comprising:
   displaying a plurality of video objects in an immersive environment, the immersive environment being a virtual reality environment generated in a head mounted display device operating in a physical environment;
   detecting, via a first input, that a first video object has been virtually positioned over a second video object;
   in response to detecting that the first video object has been virtually positioned over the second video object, generating a group video object that includes the first video object and the second video object, wherein the group video object includes a handle interface element for interacting with the group video object and a selectable indicator that represents the first video object and the second video object;
   displaying the group video object along with the handle interface element and the selectable indicator with one or more remaining video objects in the immersive environment, wherein the group video object replaces the first video object and the second video object within the immersive environment, the handle interface element being a three-dimensional handle element interacted with by detecting a grab gesture performed by a hand in the virtual reality environment; and
   in response to detecting a selection of the selectable indicator, displaying a user interface for interacting with the group video object.

2. The method of claim 1, wherein the first video object is represented by a first thumbnail representation, the second video object is represented by a second thumbnail representation, and the group video object is represented by a stacked thumbnail representation in which (i) the first thumbnail representation and the second thumbnail representation are automatically aligned to generate the stacked thumbnail representation and (ii) the first thumbnail representation is in a top position of the stacked thumbnail representation in response to detecting that the first video object was interacted with and virtually positioned over the second video object.

3. The method of claim 1, wherein the selectable indicator indicates a number of video objects contained in the group video object.

4. The method of claim 1, wherein the user interface includes an option to create a playlist that includes the first video object and the second video object in the group video object and wherein, upon selection of the group video object, the first video object and the second video object are played back in the immersive environment.

5. The method of claim 1, wherein the user interface includes an option to rearrange an order of at least the first video object and the second video object associated with the group video object.

6. The method of claim 1, wherein the user interface includes an option to remove at least one of the first video object and the second video object from the group video object.

7. The method of claim 1, wherein the user interface includes an option to remove the group video object along with the first video object and the second video object from the immersive environment.

8. The method of claim 1, further comprising, in response to detecting a particular hand interaction with the handle interface element, causing a grid of video objects included within the group video object to be presented, wherein each video object in the grid of video objects is modifiable.

9. The method of claim 1, further comprising, in response to detecting a particular hand interaction with the handle interface element, causing the group video object along with the first video object and the second video object to be removed from the immersive environment.

10. A system for interacting with immersive video content, the system comprising:
a memory; and
a hardware processor that, when executing computer-executable instructions stored in the memory, is configured to:
display a plurality of video objects in an immersive environment, the immersive environment being a virtual reality environment generated in a head mounted display device operating in a physical environment;
detect, via a first input, that a first video object has been virtually positioned over a second video object;
in response to detecting that the first video object has been virtually positioned over the second video object, generate a group video object that includes the first video object and the second video object, wherein the group video object includes a handle interface element for interacting with the group video object and a selectable indicator that represents the first video object and the second video object;
display the group video object along with the handle interface element and the selectable indicator with one or more remaining video objects in the immersive environment, wherein the group video object replaces the first video object and the second video object within the immersive environment, the handle interface element being a three-dimensional handle element interacted with by detecting a grab gesture performed by a hand in the virtual reality environment; and
in response to detecting a selection of the selectable indicator, display a user interface for interacting with the group video object.

11. The system of claim 10, wherein the first video object is represented by a first thumbnail representation, the second video object is represented by a second thumbnail representation, and the group video object is represented by a stacked thumbnail representation in which (i) the first thumbnail representation and second thumbnail representation are automatically aligned to generate the stacked thumbnail representation and (ii) the first thumbnail representation is in a top position of the stacked thumbnail representation in response to detecting that the first video object was interacted with and virtually positioned over the second video object.

12. The system of claim 10, wherein the selectable indicator indicates a number of video objects contained in the group video object.

13. The system of claim 10, wherein the user interface includes an option to create a playlist that includes the first video object and the second video object in the group video object and wherein, upon selection of the group video object, the first video object and the second video object are played back in the immersive environment.

14. The system of claim 10, wherein the user interface includes an option to rearrange an order of at least the first video object and the second video object associated with the group video object.

15. The system of claim 10, wherein the user interface includes an option to remove at least one of the first video object and the second video object from the group video object.

16. The system of claim 10, wherein the user interface includes an option to remove the group video object along with the first video object and the second video object from the immersive environment.

17. The system of claim 10, wherein the hardware processor is further configured to cause a grid of video objects included within the group video object to be presented in response to detecting a particular hand interaction with the handle interface element, wherein each video object in the grid of video objects is modifiable.

18. The system of claim 10, wherein the hardware processor is further configured to cause the group video object along with the first video object and the second video object to be removed from the immersive environment in response to detecting a particular hand interaction with the handle interface element.

19. A non-transitory computer-readable medium containing computer executable instructions that, when executed by a processor, cause the processor to perform a method for interacting with immersive video content, the method comprising:
displaying a plurality of video objects in an immersive environment, the immersive environment being a virtual reality environment generated in a head mounted display device operating in a physical environment;
detecting, via a first input, that a first video object has been virtually positioned over a second video object;
in response to detecting that the first video object has been virtually positioned over the second video object, generating a group video object that includes the first video object and the second video object, wherein the group video object includes a handle interface element for interacting with the group video object and a selectable indicator that represents the first video object and the second video object;
displaying the group video object along with the handle interface element and the selectable indicator with one or more remaining video objects in the immersive environment, wherein the group video object replaces the first video object and the second video object within the immersive environment, the handle interface element being a three-dimensional handle element interacted with by detecting a grab gesture performed by a hand in the virtual reality environment; and in response to detecting a selection of the selectable indicator, displaying a user interface for interacting with the group video object.

* * * * *